(12) United States Patent
Yang

(10) Patent No.: US 7,302,023 B2
(45) Date of Patent: Nov. 27, 2007

(54) APPLICATION OF MULTIPATH COMBINER AND EQUALIZER IN A MULTI-CHANNEL DIRECT SEQUENCE SPREAD SPECTRUM COMMUNICATION SYSTEM

(76) Inventor: George L. Yang, 15 Longfellow Ct., Freehold, NJ (US) 07728

( * ) Notice: Subject to any disclaimer, the term of this patent is extended or adjusted under 35 U.S.C. 154(b) by 925 days.

(21) Appl. No.: 10/205,116

(22) Filed: Jul. 25, 2002

(65) Prior Publication Data

US 2004/0017868 A1    Jan. 29, 2004

(51) Int. Cl.
*H03K 5/01* (2006.01)
(52) U.S. Cl. .................. 375/346; 375/316; 375/349
(58) Field of Classification Search ............... 375/130, 375/140, 147, 148, 149, 152, 316, 340, 343, 375/344, 351, 150, 229, 230, 232, 233, 341, 375/346, 348, 349, 350; 455/130, 132, 133, 455/134, 142, 143
See application file for complete search history.

(56) References Cited

U.S. PATENT DOCUMENTS

| | | | | |
|---|---|---|---|---|
| 4,567,588 A | * | 1/1986 | Jerrim | 370/479 |
| 5,345,476 A | * | 9/1994 | Tsujimoto | 375/233 |
| 5,353,301 A | * | 10/1994 | Mitzlaff | 375/152 |
| 6,151,481 A | * | 11/2000 | Wilson et al. | 455/13.3 |
| 6,631,157 B1 | * | 10/2003 | Davidovici et al. | 375/148 |
| 6,714,586 B2 | * | 3/2004 | Yang et al. | 375/148 |
| 6,990,158 B2 | * | 1/2006 | Shan et al. | 375/346 |
| 2005/0180373 A1 | * | 8/2005 | Papasakellariou et al. | 370/342 |
| 2005/0195885 A1 | * | 9/2005 | Misra et al. | 375/130 |

* cited by examiner

*Primary Examiner*—Chieh M. Fan
*Assistant Examiner*—Naheed Ejaz

(57) ABSTRACT

A receiver subsystem in a multi-channel direct sequence spread spectrum system consists of a signal register, a multipath detector, a multipath combiner, a decision-feedback equalizer, a multi-channel detector, and a multi-channel signal regenerator. First, the multipath detector finds out the information about various components of a multipath-fading signal. Then the multipath combiner combines the significant components from corresponding tapped outputs of the signal register together. Next the decision-feedback equalizer eliminates interference from the output signal of the multipath combiner. After receiving signal from the decision-feedback equalizer, a multi-channel detection circuit recovers the information and estimates the complex signal for each channel. The multi-channel signal regenerator resorts to these complex signals to generate the estimated transmission signal. It multiplies each estimated complex signal by a corresponding spreading signal, summarize all the products together, and then multiply the summation by a scrambled signal. Finally, the regenerated multi-channel signal and the delayed version of the output signal of the decision feedback equalizer are compared to produce error signal for updating the coefficients of the decision feedback equalizer.

20 Claims, 4 Drawing Sheets

APPLICATION OF MULTIPATH COMBINER AND EQUALIZER IN A MULTI-CHANNEL DIRECT SEQUENCE SPREAD SPECTRUM COMMUNICATION SYSTEM

FEDERALLY SPONSORED RESEARCH

Not Applicable

SEQUENCE LISTING OR PROGRAM

Not Applicable

FIELD OF THE INVENTION

The invention is generally related to a receiver in a communication system. More particularly, the invention is related to applying both multipath combiner and decision-feedback equalizer to a receiver in a multi-channel direct sequence spreading spectrum communication system for utilizing and combating the fading over several symbol periods.

BACKGROUND OF THE INVENTION

In a wireless communication system, especially in a mobile communication system, fading occurs from times to times. Buildings, mountains, and foliage on a transmission path can cause reflection, diffraction, and scattering on a propagating electromagnetic wave. The electromagnetic waves reflected from various large objects, travel along different paths of varying lengths. If an obstacle on the transmission path has sharp irregularities, the secondary waves resulting from the obstructing surface are present around the obstacle. Also if there are small objects, rough surfaces, and other irregularities on the transmission path, scattered waves are created. All these waves interact with each other and cause multipath fading at specific locations. The multipath fading can seriously deteriorate the quality of a communication system.

Usually there are two methods to deal with the problem caused by multipath fading. One method is to use a multipath combiner such as a RAKE receiver to combine the significant paths of a multipath-fading signal together. Another method is to use an equalizer to eliminate all paths of a multipath-fading signal except the strongest path.

A multipath combiner in a receiver is to combine significant paths together. It works effectively when the most significant paths have almost same strength and these paths do not nullify. Looking at these paths on time domain, one can see that a transmitted symbol appears several times with each time corresponding to a different path. When transmission rate is low, the multipath fading spans in less than one symbol period. Through the multipath components interfere with each other, the transmitted symbols do not cancel each other totally. However, as the transmission rate is higher and higher, a multipath fading could easily span one or more symbol periods and a symbol on one path could be almost cancelled by a previous symbol on other path. When symbols almost cancel each other or possess nulls, a multipath combiner has nothing to combine and therefore system performance declines.

A decision-feedback equalizer is effective to compensate the nulls. Basically, an equalizer in a receiver is to keep the strongest path and eliminate all other paths. It works effectively when there is a strong and stable path.

However, when a multipath fading spans one or more symbol periods and no any path is stable, either multipath combiner or equalizer does not work effectively. One example for this kind of scenario is a high-speed mobile receiver in metropolitan area. In order to have reliable communication under this kind of scenario, one may want to make the adjacent transmitted symbols different and utilize a multipath combiner to combine all these significant paths together.

A direct sequence spreading spectrum system is able to make adjacent symbols different. The delayed versions of the transmitted pseudo-noise (PN) signal have poor correlation with the original PN signal and therefore a direct sequence spread spectrum system is multipath resistant. A multipath fading causes PN chips interfered with each other. The interference caused by one chip to other chips is called interchip interference. For detection is based on a group of PN chips, or on a symbol, the mess caused by multipath fading is less severe. Usually chip rate is much higher than symbol rate and a P N period is much longer than a symbol period, therefore it is possible to distinguish the components of a multipath fading signal spanned over several symbol periods. Together with a multipath combiner, a direct sequence spread spectrum system can combine the information obtained from several resolvable multipath components and therefore improve the system performance.

One disadvantage of a direct sequence spreading spectrum system is low spectral efficiency. In order to transmit data with higher rate, a multi-channel direct sequence spreading spectrum communication system is introduced.

In a multi-channel communication system, the multipath fading could be more serious. First, each component of a multipath-fading signal on a particular channel not only interferes with the other components of the signal on the same channel, but also interferes with each component of the signals on other channels. The interference caused by a component on a channel to other components on the same channel is called intersymbol interference. The interference caused by a component on a channel to the components on other channel is called interchannel interference. Second, even if each symbol on each channel has poor correlation with their neighbor symbols, a delay version of the current symbol on a particular channel could almost cancel some future symbol on one of the other channels and possess null on that channel.

Based on above discussion, it is interesting to employ both multipath combiner and decision-feedback equalizer in a multi-channel communication system.

One way to employ both multipath combiner and equalizer in a receiver of multichannel communication system is to use an equalizer and a multipath combiner for each channel. There are two problems. One problem is huge hardware consumption. For a multi-channel system with 64 channels, there will be 64 multipath combiners and 64 equalizers. Another problem is that each equalizer works independently, which may not be a good choice to subdue interchannel interference. In order to reduce interchannel interference, one may introduce some connections among these equalizers, which makes the design even further complex.

Another way to employ both multipath combiner and equalizer in a receiver of multi-channel communication system is to use an equalizer for selecting each significant path of a multipath fading signal and to use a multipath combiner to combine the signals from all of these equalizers together. There are some problems also. The several significant paths do not have equal power. The equalizer, which selects a path with relatively small signal strength, may not work effectively especially when the path is not stable. Also, in metropolitan area, usually at least 4 paths have to be considered and therefore there must be at least 4 equalizers. The hardware consumption is still a lot.

Therefore, in order to save hardware, it is attractive to use one multipath combiner to combine the signals of several significant paths together and use one decision-feedback equalizer to take care of interference in a multi-channel communication system.

OBJECTIVES OF THE INVENTION

The primary objective of the invention is to utilize and combat the multipath fading in a multi-channel direct sequence spread spectrum communication system by employing a multipath combiner to combine the signals from several significant paths together and an equalizer to eliminate the interchip interference, intersymbol interference, and interchannel interference.

Another objective of the invention is to utilize and combat the multipath fading in a direct sequence spread spectrum communication system by employing a multipath combiner to combine the signals from several significant paths together and an equalizer to eliminate the interchip interference and intersymbol interference.

Another objective of the invention is to utilize and combat the multipath fading in a communication system by employing a multipath combiner to combine the signals from several significant paths together and an equalizer to eliminate the intersymbol interference.

BRIEF DESCRIPTION OF THE DRAWINGS

The accompanying drawings, which are incorporated in and constitute a part of the specification, depict the preferred embodiment of the present invention, and together with the description, serve to explain the principle of the invention. In the figures, like reference numerals refer to the same or similar elements.

DETAILED DESCRIPTION OF THE PREFERRED EMBODIMENT

Detailed description of the preferred embodiment is provided herein. The embodiment illustrates the essential of a receiver with a multipath combiner and a decision feedback equalizer in a multi-channel direct sequence spread spectrum communication system by way of example, not by way of limitation. It is to be understood that it could be easy for those skilled in the art to modify the embodiment in many different ways. For example, when there is just one channel in a multi-channel direct sequence spread spectrum communication system, then the system will become a regular direct sequence spread spectrum communication system. Therefore, specific details disclosed are not to be interpreted as limitations, but rather as bases for the claims and as representative bases for teaching one to employ the present invention in virtually any appropriately detailed system, structure or manner.

Figure 1:
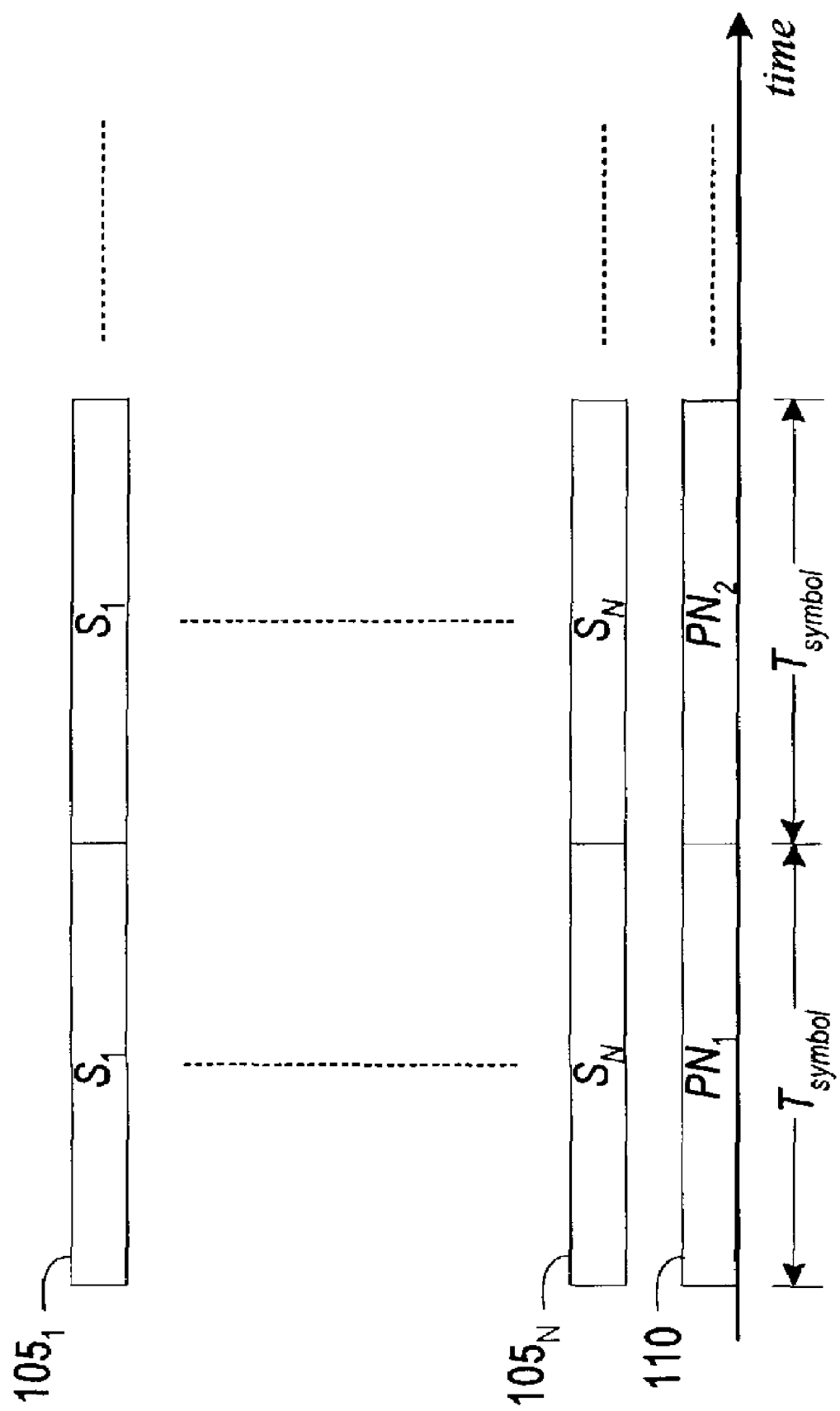
FIG. 1 illustrates spreading signals for each of multi-channels and a scrambled signal of a multi-channel direct sequence spread spectrum communication system.

FIG. 1 shows spreading signals for each of multi-channels and a scrambled signal of a multi-channel direct sequence spread spectrum communication system.

There are N spreading signals $105_1$ to $105_N$ with one for each of the N channels. These N spreading signals $S_1$ to $S_N$ are different from each other. Actually, they are orthogonal in many cases. Also in many systems, the spreading signals $S_1$ to $S_N$ do not change from one symbol period to another.

There is a scrambled signal PN 110. The section of PN signal in the first symbol period is denoted by $PN_1$, in the second symbol period is denoted by $PN_2$, and so on. Assume L is the number that no significant component of a multipath signal will span over more than L symbol periods. In order to distinguish multipath components of a signal, the section of a scramble signal in a symbol period is different from the section in any of its 2L neighbor symbol periods.

Figure 2:
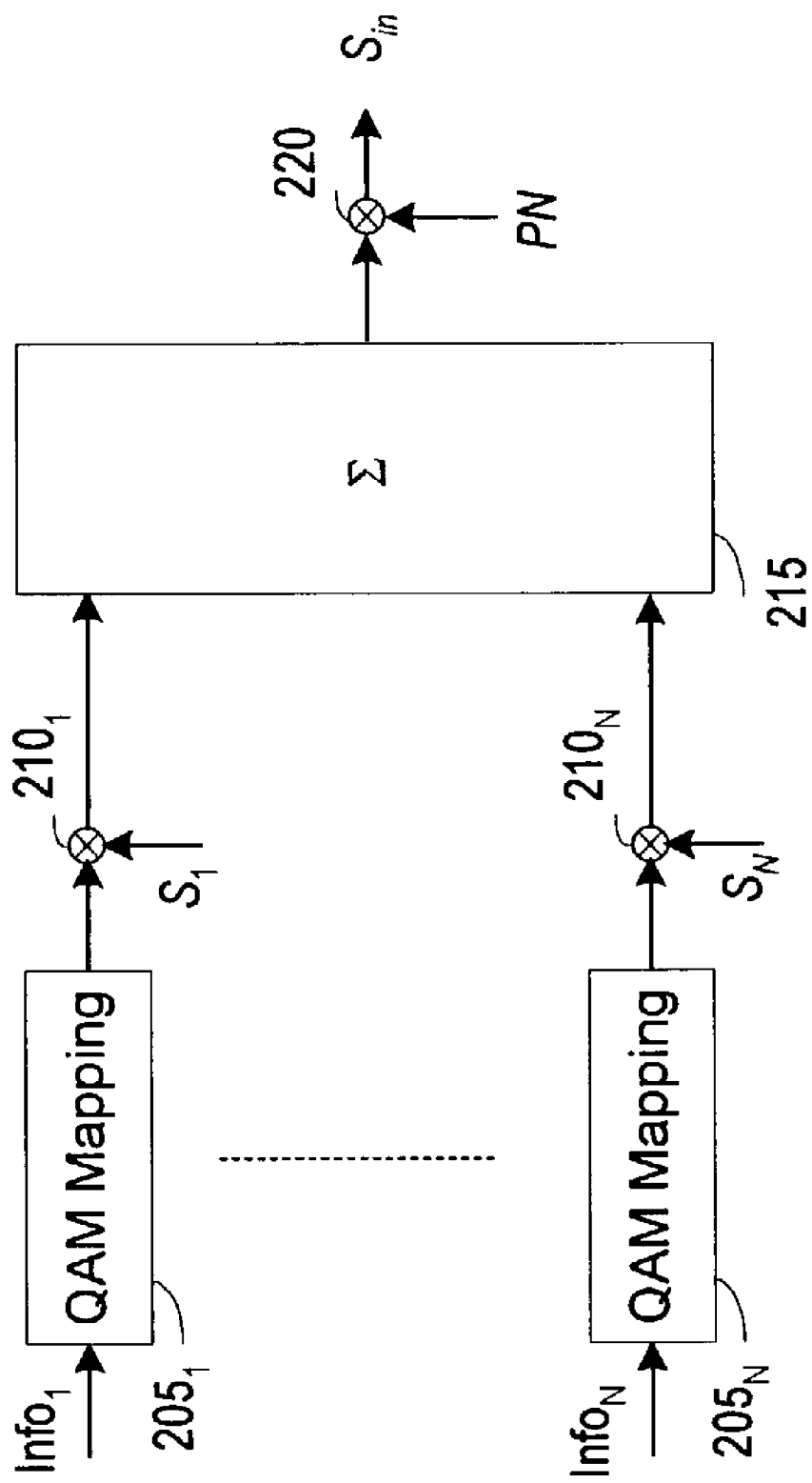
FIG. 2 illustrates the essential of a transmitter in a multi-channel direct sequence spread spectrum communication system with the spreading signals and the scrambled signal as in FIG. 1.

FIG. 2 shows the essential of a transmitter corresponding to the signals in FIG. 1.

There are N quadrature amplitude modulation (QAM) mapping devices $205_1$ to $205_N$. The bit stream for each channel is divided into a series of blocks with each block having a predetermined number of bits. Each of the mapping devices $205_1$ to $205_N$ maps a corresponding series of blocks into a complex signal, which consists of a series of complex numbers.

There are N multipliers $210_1$ to $210_N$. Each multiplier multiplies a complex signal with a corresponding spreading signal from the set of spreading signals $S_1$ to $S_N$. The adder 215 sums up the products from all these multipliers together. The multiplier 220 further multiplies the summation by a scrambled signal PN.

Figure 3:
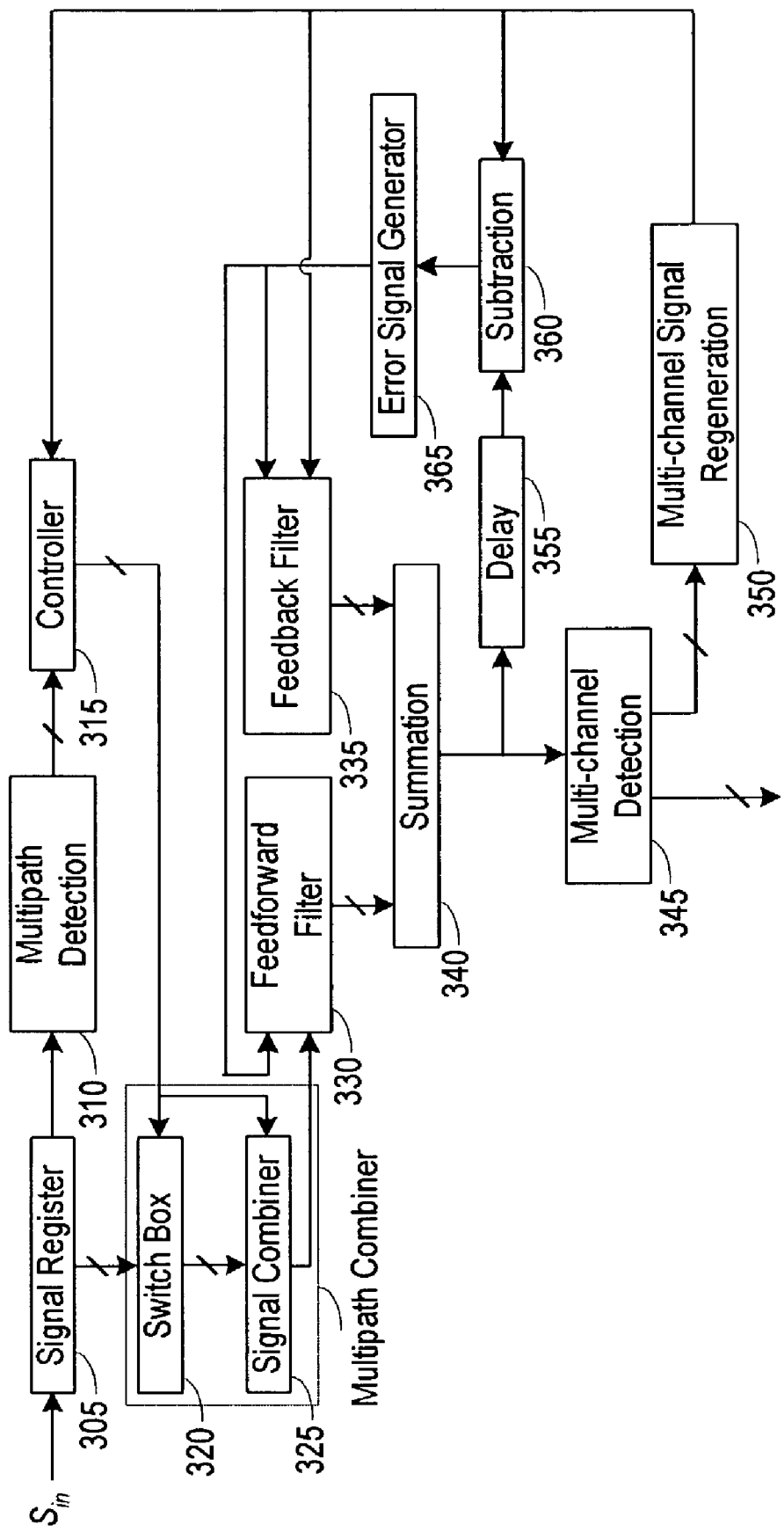
FIG. 3 illustrates the essential of a receiver with a multipath combiner and a decision feedback equalizer in a multi-channel direct sequence spread spectrum communication system with the spreading signals and the scrambled signal as in FIG. 1.

FIG. 3 shows the essential of a receiver with a multipath combiner and a decisionfeedback equalizer in a multi-channel direct sequence spread spectrum communication system with the spreading signals and the scrambled signal as in FIG. 1. The receiver is corresponding to the transmitter in FIG. 2.

The signal register 305 consists of a plurality of registers with the first register connected to input signal $S_{1n}$ and each of the rest registers connected to its previous one. Usually a sampling clock drives all these registers. There are M tapped output signals. These M tapped output signals are a moving section of the down-sampled signal of the input signal $S_{1n}$. The delay between any two adjacent output signals is the same. When there is a tapped output every K registers, then the down-sampling rate is K. When there is a tapped output each register, there is no down sampling and K is equal to 1.

The multipath detection device 310 detects multipath information from the output signals of the signal register 305. A multipath detection device could be built based on matched filter or correlator.

The controller 315 extracts information about each path of a multipath-fading signal from the output of multipath detection device 310. The controller 315 will also generate various control signals such as path selecting signals, path strength signals, and path timing signals.

The multipath combiner basically consists of a switch box and a signal combiner.

The switch box is a plurality of gate circuits. With the control signals from controller 315, the switch box 320 selects several taped outputs from the signal register 305. These taped outputs correspond to the several significant paths. The maximum number of selected taped outputs is predetermined.

The signal combiner 325 combines the selected tapped output signals together. Usually there are three combining methods, that is, maximum ratio combining (MRC), equal gain combining (EGC) and selection combining (SLC). A signal combiner could consist of delay circuit, phase rotating circuit, weighting circuit, and summation circuit. The signal combiner 325 has different structure for different combining method. For simplicity, the output signal of the signal combiner 325 is called as a combined signal.

For maximum ratio combining, the delay circuit inserts different delay for different path so that these paths can align up on time. The phase rotating circuit rotates each path by some degree so that all these paths have a same phase. The weighting circuit assigns each path a weight corresponding to the signal strength of that path. Finally, the summation circuit combines all the paths together according to their weights. The output signal from summation circuit is a combination signal, which is statistically, a better estimate of the transmitted signal than each of these component signals is.

The output of the signal combiner 325 only has one significant component instead of several significant components. With only one significant component in its input signal, an equalizer works effectively.

Proper delaying and down-sampling could be inserted so that the signal combiner 325 has chip rate output signal whose significant component aligned up with a symbol clock.

A decision feedback equalizer takes its input signal from the output of the signal combiner 325. The decision feedback equalizer consists of a feedforward filter 330, a feedback filter 335, a summation circuit 340, a detection circuit 345, and error signal generator 365.

The feedforward filter 330 is a linear transversal filter. A linear transversal filter is made up of tapped delay lines, with the tappings spaced at the chip interval $T_c$. The feedforward filter 330 takes the output signal from signal combiner 325 as its input. Functionally, it is to remove the interference caused by future symbols from the estimates of the current symbols. This type of interferences is called as a pre-cursor interference.

The feedback filter 335 is also a linear transversal filter with tappings spaced at the chip interval $T_c$. It takes the decisions on previously symbols as its input. Functionally, the feedback filter 335 is to remove the interference caused by previous detected symbols from the estimates of the current symbols. This type of interferences is called as a post-cursor interference.

The summation circuit 340 adds up the output signals from both filters. The output signal of the summation circuit 340 is called as an equalized signal.

The multi-channel detection device 345 takes its input from the output of summation 340. It could be built based on matched filter or on integrate-and-dump detector. The multi-channel detection device 345 demodulates the information on each channel. The multi-channel detection device 345 has two kinds of outputs. One is a group of complex signals with each one corresponding to a channel. Each complex signal consists of a series of complex numbers with each of these complex number is an estimation of the corresponding complex number at transmitter. Another is a group of blocks of data bits. Each block of data bits is the inverse mapping a corresponding complex number into a predetermined number of data bits.

Figure 4:
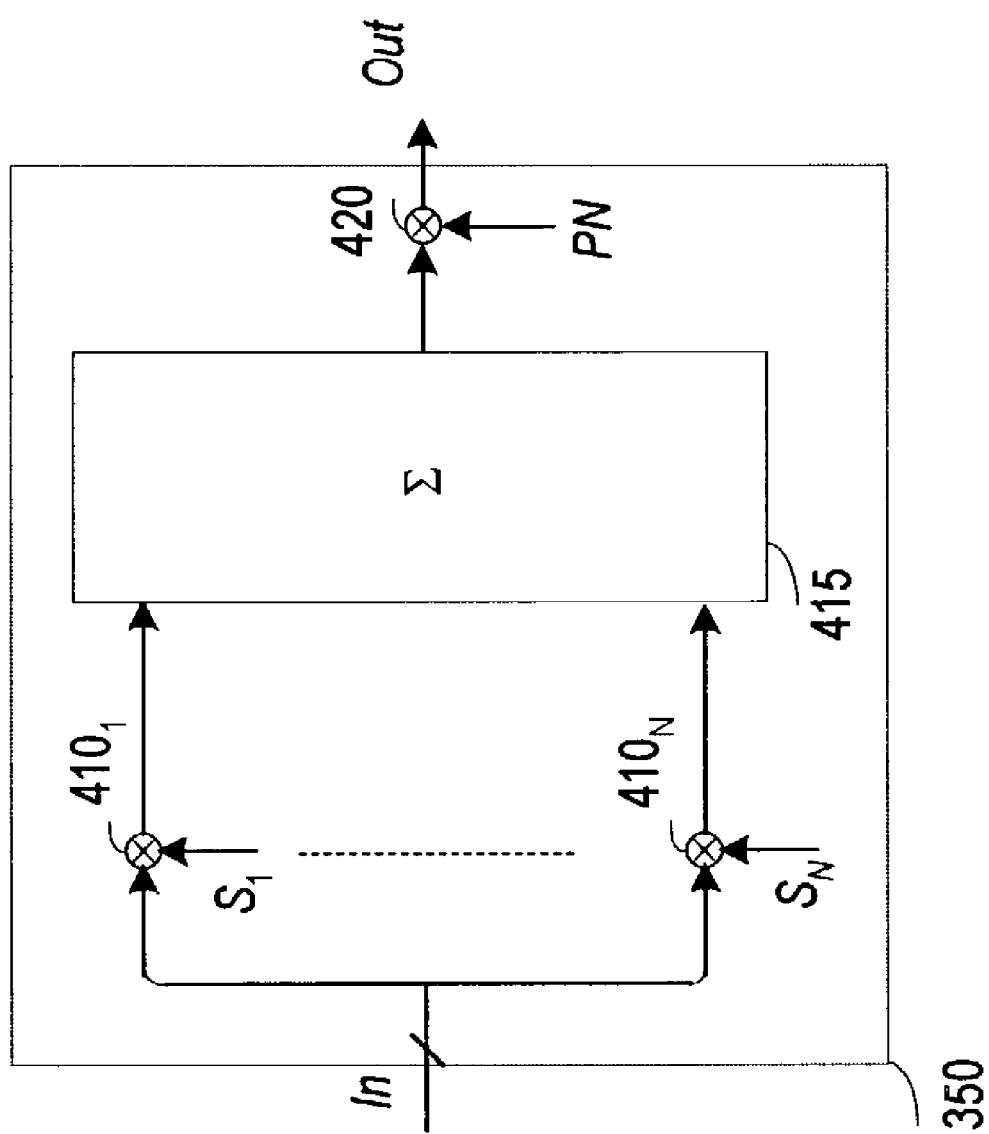
FIG. 4 illustrates a signal regeneration device for a multi-channel direct sequence spread spectrum communication system with the spreading signals and the scrambled signal as in FIG. 1.

The multi-channel signal regeneration circuit 350 receives all the complex signals and generates a multi-channel signal, which is the estimation of the transmitted multi-channel signal. The details of the multi-channel signal regeneration circuit 350 is shown in FIG. 4. The multi-channel signal regeneration circuit 350 could further include a channel estimator for more accurately cancelling interferences caused by post-cursor signals.

The delay circuit 355 also takes its input from the output of summation 340. It inserts proper delay so that the signal from delay circuit 355 and the signal from the multi-channel signal regeneration circuit 350 align up on time.

The subtraction circuit 360, receiving signals from both delay circuit 355 and multi-channel signal regeneration device 350, is to generate a difference signal between its two input signals.

The error signal generator circuit 365, receiving the difference signal from subtraction circuit 360, produces an error signal which is sent to both feedforward filters 330 and feedback filter 335 to update the coefficients of each filter.

FIG. 4 shows the signal regeneration device for a multi-channel direct sequence spread spectrum communication system with the spreading signals and the scrambled signal as in FIG. 1. FIG. 4 provides details for the multi-channel signal regeneration circuit 350 in FIG. 3.

Each of the multipliers $410_1$ to $410_N$ multiplies a complex signal with a corresponding spreading signals $S_1$ to $S_N$. The adder 415 sums up all the products together. The multiplier 420 multiplies the summation with a scrambled signal PN. The result signal is a regenerated multi-channel direct sequence spread spectrum signal.

What is claimed is:

1. A receiver subsystem in a multi-channel communication system deployed in a fading environment, said receiver subsystem receiving a multipath fading signal for combining a plurality of significant multipath signals to produce a combined signal and for reducing a plurality of interferences from said combined signal to generate an equalized signal, wherein said plurality of interferences comprise a plurality of pre-cursor interferences and a plurality of post-cursor interferences, wherein said multi-channel communication system has a plurality of communication sub-channels with each sub-channel transmitting a plurality of corresponding data bits, said receiver subsystem comprising:

a signal register consisting of a plurality of shift registers, coupled to receive said multipath fading signal, for capturing a moving section of said multipath fading signal and for providing a plurality of tapped output signals with each tapped output signal taken from a corresponding shift register of said plurality of shift registers;

a multipath detection device, coupled to said signal register, for detecting said plurality of significant multipath signals;

a multipath combiner, coupled to said signal register to receive said plurality of tapped output signals, for combining said plurality of significant multipath signals together to generate said combined signal;

a first transversal filter, coupled to said multipath combiner to receive said combined signal, for removing said plurality of pre-cursor interferences from said combined signal;

a second transversal filter, for estimating said plurality of post-cursor interferences on said combined signal;

a summation circuit, coupled to said first transversal filter and said second transversal filter, for generating said equalized signal with said plurality of pre-cursor interference and said plurality of post-cursor interferences decreased;

a multi-channel detection circuit, coupled to said summation circuit to receive said equalized signal, for demodulating each corresponding communication sub-channel to produce said plurality of corresponding data-bits;

a multi-channel signal regeneration device, coupled to said multi-channel detection circuit, for regenerating an estimated transmission signal; and a controller, coupled to said multipath detection device, for generating a multipath fading profile about said multipath fading signal, updating said multipath fading profile, and producing a plurality of control signals for said multipath combiner.

2. The receiver subsystem as in claim 1, wherein said first transversal filter has a plurality of first type of updatable coefficients and wherein said second transversal filter has a plurality of second type of updatable coefficients, said receiver subsystem further comprising:

a delay circuit, coupled to said summation circuit, for delaying said equalized signal for a certain amount of time to produce a delayed equalized signal aligned up with said estimated transmission signal;

a subtraction circuit, coupled to said delay circuit and said multi-channel signal regeneration device, for generating a difference signal between said delayed equalized signal and said estimated transmission signal; and an error signal generator, coupled to said subtraction circuit, for providing an error signal for updating said plurality of first type of updatable coefficients and said plurality of second type of updatable coefficients.

3. The receiver subsystem as in claim 1, wherein said multipath combiner is a device selected from a group consisting of a maximum ratio combiner, an equal gain combiner, and a selecting combiner.

4. The receiver subsystem as in claim 1, wherein said multi-channel communication system is a multi-channel direct sequence spread spectrum communication system with each sub-channel being spread by a corresponding spreading signal, wherein said multi-channel signal regeneration device consists of a plurality of multipliers and an adder, with each multiplier for modulating each said plurality of corresponding data-bits by a corresponding spreading signal to produce a corresponding spread signal, with said adder adding all corresponding spread signals together to generate a multi-channel spread signal.

5. The receiver subsystem as in claim 1, wherein said multipath detection device comprises apparatus selected from a group consisting of a set of matched filters and a set of correlators.

6. The receiver subsystem as in claim 1, wherein said multi-channel detection circuit comprises apparatus selected from a group consisting of a set of integrate-and-dump detector and a set of matched filters.

7. The receiver subsystem as in claim 1, wherein said multi-channel signal regeneration device consists of a device for estimating effects of said fading environment on a transmission signal.

8. The receiver subsystem as in claim 1, wherein said multi-channel detection circuit further produces a plurality of complex signals with each complex signal for a corresponding communication sub-channel.

9. A receiver subsystem in a spread spectrum communication system deployed in a fading environment, said receiver subsystem receiving a multipath fading signal for utilizing a plurality of significant multipath signals and combating a plurality of interferences, said receiver subsystem comprising:

a signal register consisting of a plurality of shift registers, coupled to receive said fading signal, for capturing a moving section of said multipath fading signal and for providing a plurality of tapped output signals with each tapped output signal taken from a corresponding shift register of said plurality of shift registers;

a multipath detection device, coupled to said signal register, for detecting said plurality of significant multipath signals from said multipath fading signal;

a multipath combiner, coupled to said signal register to receive said plurality of tapped output signals, for combining said plurality of significant multipath signals together to generate said combined signal;

an equalizer, coupled to said multipath combiner, for eliminating said plurality of interferences from said combined signal to generate an equalized signal;

a detection circuit, coupled to said equalizer, for demodulating said equalized signal;

a signal regeneration device, coupled to said detection circuit, for regenerating a estimated spread spectrum transmission signal; and a controller, coupled to said multipath detection device, for generating a multipath profile of said multipath fading signal, updating said multipath fading profile, and producing a plurality of control signals for said multipath combiner.

10. The receiver as in claim 9, wherein said equalizer is a decision feedback equalizer consisting of a feedforward filter, a feedback filter, a summation circuit, a detection circuit, and an error signal generator.

11. The receiver subsystem as in claim 9, wherein said multipath combiner consists of a switch box and a signal combiner to select said plurality of significant signals, align up said plurality of significant signals, and combine each said plurality of significant signals with a corresponding weight.

12. The receiver subsystem as in claim 11, wherein said signal combiner is selected from a group consisting of a maximum ratio combiner, an equal gain combiner, and a selection combiner.

13. The receiver subsystem as in claim 9, wherein said multipath detection device comprises an element selected from a group consisting of a set of matched filters and a set of correlators.

14. The receiver subsystem as in claim 9, wherein said detection circuit comprises an element selected from a group consisting of a matched filter and an correlator.

15. The receiver subsystem as in claim 9, wherein said detection circuit further produces a complex signal and a plurality of data bits from said equalized signal.

16. The receiver subsystem as in claim 9, wherein said signal regeneration device consists of a plurality of multipliers and an adder, with each multiplier multiplying a detected complex signal by a corresponding spreading signal, with said adder adding all the products together to produce a summation signal, and with said summation signal further multiplied by a scrambled signal.

17. The receiver subsystem as in claim 9, said signal regeneration device further comprises a communication channel estimator.

18. A receiver subsystem in a high speed broadband communication system deployed in a fading environment, said receiver subsystem receiving a multipath fading signal for combining a plurality of significant multipath signals to produce a combined signal and for reducing a plurality of interferences from said combined signal to generate an equalized signal, wherein fading environment spans said multipath fading signal over a plurality of symbol periods, said receiver subsystem comprising:
- a signal register consisting of a plurality of shift registers, coupled to receive said multipath fading signal, for capturing a moving section of said multipath fading signal and for providing a plurality of tapped output signals with each tapped output signal taken from a corresponding shift register of said plurality of shift registers;
- a multipath detection device, coupled to said signal register, for detecting said plurality of significant multipath signals;
- a multipath combiner, coupled to said signal register to receive said plurality of tapped output signals, for combining said plurality of significant multipath signals together to generate a combined signal;
- an equalizer, coupled to said multipath combiner, for eliminating said plurality of interferences to produce said combined signal to generate an equalized signal;
- a detection circuit, coupled to said equalizer, for demodulating said equalized signal;
- a signal regeneration device, coupled to said detection circuit, for regenerating a estimated transmission signal; and
- a controller, coupled to said multipath detection device, for generating a multipath profile of said multipath fading signal, updating said multipath fading profile, and producing a plurality of control signals for said multipath combiner.

19. The receiver subsystem as in claim 18, wherein said equalizer is a decision feedback equalizer consisting of a feedforward filter, a feedback filter, a summation circuit, a detection circuit, and an error signal generator.

20. The receiver subsystem as in claim 18, wherein said signal regeneration device further comprises a communication channel estimator.

* * * * *